July 22, 1969  R. J. MEIJER ET AL  3,456,438
THERMODYNAMIC ENGINE
Filed Oct. 3, 1967  4 Sheets-Sheet 1

INVENTORS
ROELF J. MEIJER
HERMAN FOKKER
ROLAND A.J.O. VON WITTEVEEN
BY

*Frank R. Trifari*

AGENT

July 22, 1969 R. J. MEIJER ET AL 3,456,438
THERMODYNAMIC ENGINE
Filed Oct. 3, 1967 4 Sheets-Sheet 3

INVENTORS
ROELF J. MEIJER
HERMAN FOKKER
ROLAND A.J.O. VON WITTEVEEN
BY
AGENT

United States Patent Office 3,456,438
Patented July 22, 1969

3,456,438
THERMODYNAMIC ENGINE
Roelf Jan Meijer, Herman Fokker, and Roland Anton Johan Otto van Witteveen, Emmasingel, Netherlands, assignors, by mesne assignments, to U.S. Philips Corporation, New York, N.Y., a corporation of Delaware
Filed Oct. 3, 1967, Ser. No. 672,575
Claims priority, application Netherlands, Oct. 4, 1966,
6613950
Int. Cl. F01k 27/00; F02g 1/00
U.S. Cl. 60—24
9 Claims

ABSTRACT OF THE DISCLOSURE

This invention provides a method and an apparatus for reducing nitrogen oxides in flue gas produced during combustion in a hot gas engine. A quantity of a substantially inert medium such as discharged flue gas, is flowed into the duct supplying combustion-air to the burner with the result being a reduced combustion temperature and reduced quantity of nitrogen oxides in the flue gas.

---

Figure 1:
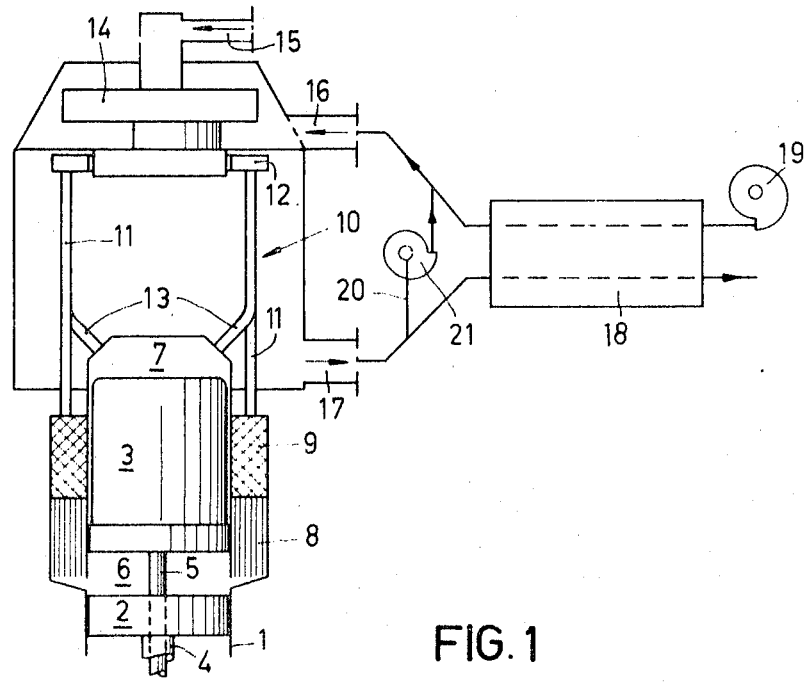

The invention relates to a thermodynamic engine particularly suitable for use in spaces where pollution of air has to be restricted. This engine comprises one or more compression spaces of variable volume and lower average temperatures, communicating with one or more expansion spaces also of variable volume but having a higher average temperature, with the junction between said spaces including a regenerator and a heater. The engine further comprises at least one burner device communicating with at least one fuel supply duct and at least one combustion air supply duct, the latter duct being linked to the burner via at least one preheater, while the outlet of the burner device communicates through the heater with the preheater in which the combustion air and the flue gases are capable of exchanging heat.

Thermodynamic engines of the kind set forth are known. As compared with internal combustion engines these thermodynamic engines have the advantage inter alia that the flue gases are considerably purer, that is to say they contain less carbon monoxide. These thermodynamic engines are extremely suitable for use at places where the pollution of air has to be minimized. Such places may be factory halls, storages where the engine is stationary, or vans driven by this engine and mines, where the engine is used as the prime mover in vans. Although the flue gases have a low carbon-monoxide content, it has been found that they also contain a smaller quantity of nitrogen oxides which are harmful to health and should therefore not exceed a given concentration in the atmosphere. This means that for keeping the concentration of these oxides within the given limits, the spaces where the engine is operative have to be ventilated which is of course a disadvantage.

The invention has for its object to provide a thermodynamic engine with which the quantity of nitrogen oxides in the flue gases can be further reduced, when the engine is employed in a space where the atmosphere should not be polluted. The present invention is based on the recognition of the fact that the development of nitrogen oxides increases strongly with the combustion temperature. A reduction of the quantity of nitrogen oxides in the flue gases can be obtained, in accordance with the invention, by preventing the combustion temperature from rising excessively.

For this purpose the thermodynamic engine according to the invention is characterized in that there is provided a variable or non-variable device for the introduction of a stream of at least substantially inert medium into the combustion air supply duct for the burner device. By adding a stream of inert medium to a stream of combustion air, the quantity of medium entering the burner device increases so that a higher quantity of medium has to be heated up to the combustion temperature which will therefore be lower than in the absence of the inert medium in the stream of combustion air. This results in a considerably lower quantity of nitrogen oxides in the flue gases.

A further advantageous embodiment of the thermodynamic engine according to the invention is characterized in that between the combustion air supply duct and the flue gas outlet there is provided a connecting duct, as well as a variable or non variable device for supplying a portion of the stream of flue gases to the stream of combustion air. Owing to the larger quantity of medium supplied to the burner device the combustion temperature will be lower. It is surprising in this case that although the flue gases consist for the major part of nitrogen a reduction of the quantity of nitrogen oxides is nevertheless obtained.

In a further advantageous thermodynamic engine embodying the invention, the connecting duct opens out at one end in a part of the flue gas outlet located between the heater and the preheater and at the other end in a part of the combustion air supply duct located between the preheater and the burner device. In this embodiment a part of the hot flue gases is recirculated in the hot stream of combustion air which has passed through the preheater. In this embodiment the preheater will be traversed in both directions by a smaller flow of medium than the flow of medium supplied to the burner device; the preheater is thus balanced out so that the emerging flue gases will have approximately the same temperature as the incoming combustion air, so that no heat gets lost.

A further effective development of the thermo-dynamic engine according to the invention is characterized in that the connecting duct opens out at one end in a part of the flue gas outlet located after the exit of the flue gases, and at the other hand in a part of the combustion air supply duct located in front of the entrance of this air into the preheater. In this embodiment a stream of cold flue gases is thus supplied through the connecting duct to the cold combustion air. The pre-heater will thus be loaded partly more heavily which may involve the disadvantage of a slightly greater flow and heat-exchange losses. An advantage of this embodiment, is, however, that the means for adding the flue gas to the combustion air can now operate at room temperature.

In a further advantageous embodiment the connecting ducts may open out at one end in a part of the flue gas outlet located between the heater and the preheater, and at the other end in a part of the combustion air supply duct located in front of the entrance of this air in the preheater. Consequently a portion of the hot flue gases is separated off before they enter the preheater and is added to the combustion air, before it has entered the preheater. This means that the preheater is brought out of equilibrium so that after the preheater, the combustion air has a lower temperature than in the two preceding embodiments. In this embodiment two different effects are obtained: inert gas is added to the combustion air and the combustion air leaves the preheater at lower temperature so that the temperature of combustion may be considerably lower. The same is achieved in a further embodiment of the thermodynamic engine according to the invention, in which the connecting duct opens out at one end in a part of the flue gas outlet located after the exit of these gases from the preheater and at the other end in a part of the combustion air supply duct located after the exit of this air from the preheater.

In a further effective embodiment of the thermodynamic engine according to the invention, the device for supplying a stream of inert gas in the combustion air supply duct is formed by a ventilator which may be controllable.

In another embodiment this ventilator is arranged in the connecting duct between the source of inert gas and the combustion air supply duct.

A further advantageous thermodynamic engine embodying the invention is characterized in that the ventilator is arranged in that part of the combustion air supply duct which is located between the burner device and the place where the connecting duct for the inert gas opens out in the supply duct, or in the part of the flue gas outlet which is located between the heater and the place where the connecting duct joins the flue gas outlet duct. A controllable closing member is included in at least the connecting duct. In this embodiment the ventilator may serve at the same time for drawing in by suction the combustion air from the atmosphere and for drawing in the inert gas or the flue gas.

A further advantageous embodiment of the thermodynamic engine according to the invention is characterized in that the device for the supply of the flow of inert gas in the combustion air supply duct is formed by an injector; the high pressure inlet side of the injector communicates with the combustion air supply duct, the suction side communicates with the source of inert gas, and the outlet side communicates with the burner device. Such an injector has the advantage that the mixing ratio of the high pressure combustion air and the inert gas drawn in by suction is always the same.

The invention will now be described more fully with reference to the drawing.

FIGURES 1 to 6 show diagrammatically and not to scale a number of embodiments of thermodynamic engines in which a connecting duct is provided between the flue gas outlet duct and the combustion air supply duct, and devices are provided for supplying a portion of the flue gases to the quantity of combustion air flowing towards the burner device.

Referring to FIGURE 1, reference numeral 1 designates a cylinder in which a piston 2 and a displacer 3 are adapted to reciprocate with a phase difference. The piston 2 and the displacer 3 are connected by a piston rod 4 and a displacer rod 5 to a driving gear, (not shown). Between the piston 2 and the displacer 3 there is a compression space 6 and an expansion space 7 is located above the displacer 3. The compression space 6 and the expansion space 7 communicate with each other via a cooler 8, a regenerator 9 and a heater 10. The heater 10 comprises a plurality of pipes 11, which join at one end the regenerator 9 and at the other end a ring duct 12 and a plurality of pipes 13, which join at one end the ring duct 12 and at the other end the expansion space 7. The thermodynamic engine comprises furthermore a burner device 14, with which communicates a fuel supply 15. The burner device comprises furthermore a combustion air supply duct 16. The outlet duct of the burner device communicates through the heater 10 with the flue gas outlet duct 17. The engine comprises furthermore a preheater 18, in which the combustion air and the flue gases can exchange heat. The combustion air is sucked in by a fan 19 and supplied via the preheater 18 to the combustion air supply duct 16. The flue gas outlet duct 17 opens out through the preheater 18 in the surroundings. The flue gas outlet duct 17 and the combustion air supply duct 16 communicate with each other through a duct 20, including a fan which may be controllable. The connecting duct 20 communicates at one end with the flue gas outlet duct 17 located between the preheater and the heater and at the other end with the portion of the combustion air supply duct 16 lying between the preheater 18 and the burner device 14. This means that through the duct 20 a quantity of hot flue gases is transported from the duct 17 to the duct 16. The quantity of medium supplied to the burner will therefore be greater than in the absence of the connecting duct 20. This results in that the temperature in the burner will be lower than in the absence of the connecting duct 20. In a surprisingly simple manner the quantity of nitrogen oxides in the flue gases is thus reduced.

Figure 2:
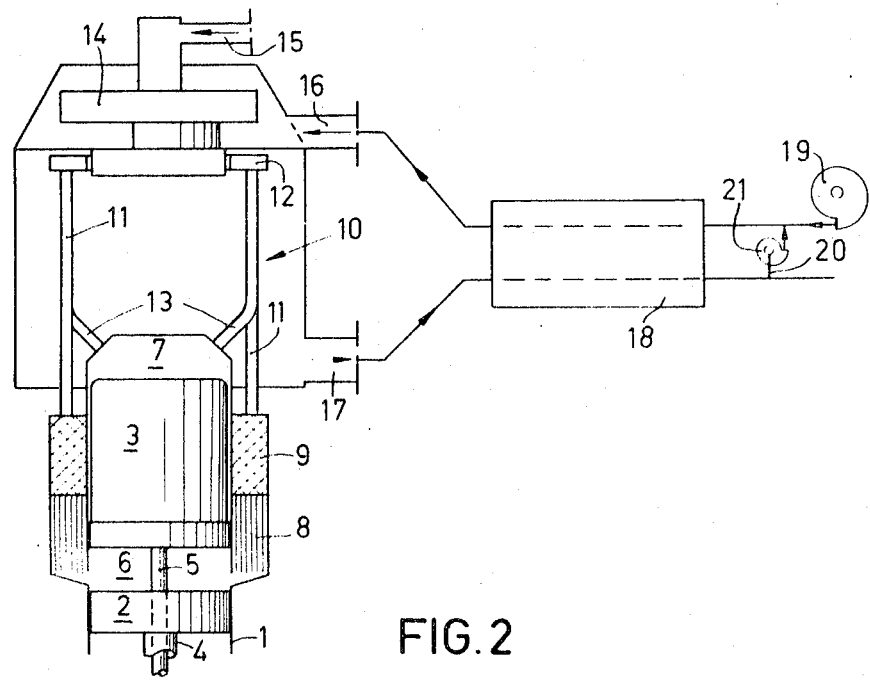

Instead of adding hot flue gases to hot combustion air, cold flue gases may be added to cold combustion air. The construction is then as shown in FIGURE 2, in which the duct 20 including the fan 21 opens out at one end in the parts of the flue gas outlet duct located after the exit of these gases from the preheater 18, and at the other end in the portion of the combustion air supply duct located in front of the entrance of this air and the preheater 18. The advantage of this construction is that the fan 21 can operate at room temperature, which is, of course, more advantageous for the lifetime, Moreover, the dimensions of the fan may be smaller since the air transferred has a lower temperature. A disadvantage however is that the preheater 18 has then to deal with a greater flow of flue gases and combustion air, so that the losses of heat exchange and flow will be slightly higher than in the construction of FIGURE 1.

Figure 3:
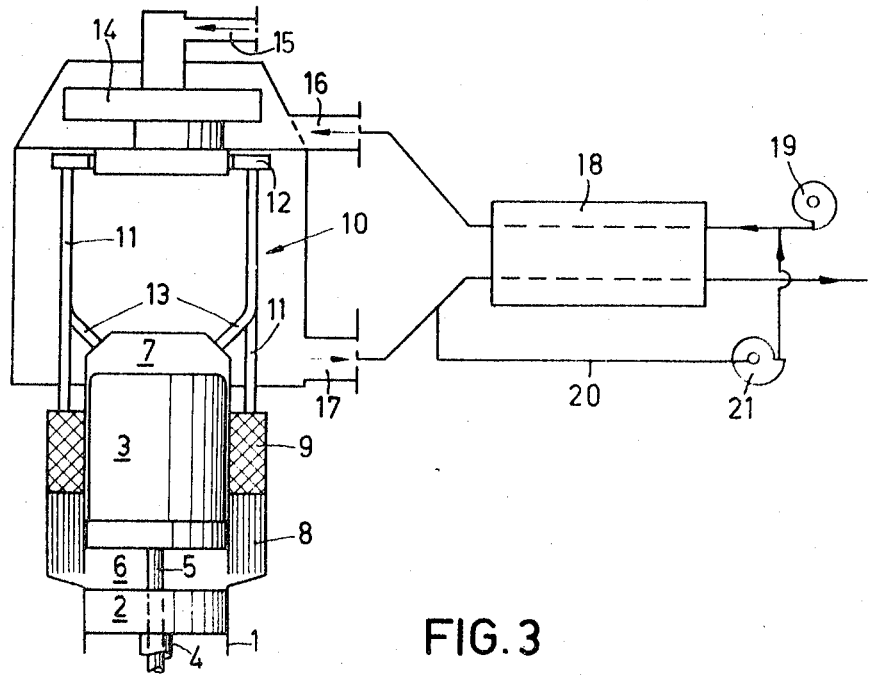
Figure 4:
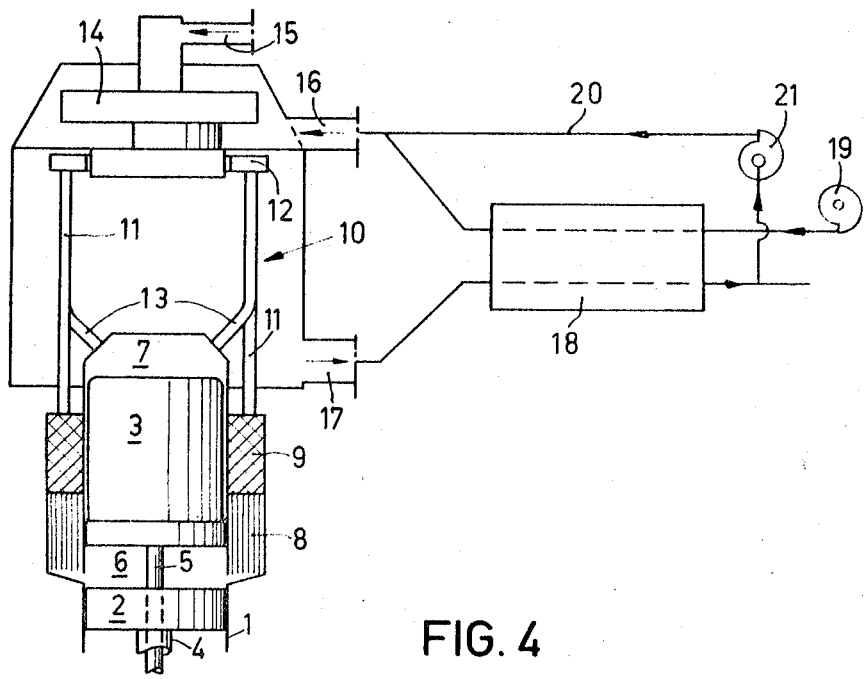

In the thermodynamic engine shown in FIGURE 3, the connecting duct is arranged so that it opens out at one end in that part of the flue gas outlet duct which is located between the heater and the preheater, and at the other end in that part of the combustion air supply duct which is located between the fan 19 and the preheater 18. This means that a portion of the hot flue gases by-passes the preheater 18 and is then supplied to the cold combustion air. This means that the preheater 18 is out of equilibrium, so that the combustion air will leave the preheater at a lower temperature than that of the flue gases when they enter the preheater. Owing to the lower temperature of the combustion air entering the burner, the temperature at which the combustion occurs must be lower. In this embodiment two effects intensify each other, resulting in a greater quantity of medium by the addition of a portion of the flue gases, and a lower temperature of the combustion air when it enters the burner. These factors contribute to the reduction of the quantity of nitrogen oxides. In this construction the flue gases leave the preheater at a higher temperature than that at which the combustion air enters the preheater, so that a certain amount of heat is lost. A similar effect is obtained in the device of FIGURE 3 as that obtained in the engine of FIGURE 4, where the connecting duct opens out at one end of the flue gas outlet duct located after the exit of these gases from the preheater 18, and at the other end in the combustion air supply duct located between the preheater and the heater. The advantage of the construction shown in FIGURE 4 is that the fan 21 can operate substantially at room temperature so that the fan may be smaller and have a longer lifetime.

In the thermodynamic engines illustrated in the figures described so far, an additional fan 21 is always required for transferring a portion of the flue gases to the combustion air supply duct. Consequently two fans 19 and 21 are provided in these engines.

Figure 5:
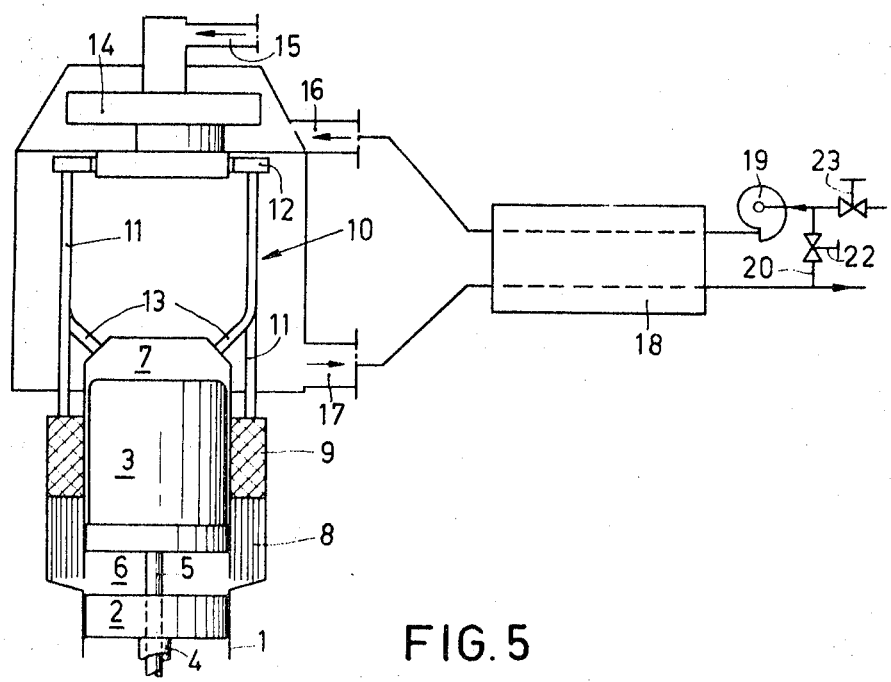
Figure 5A:
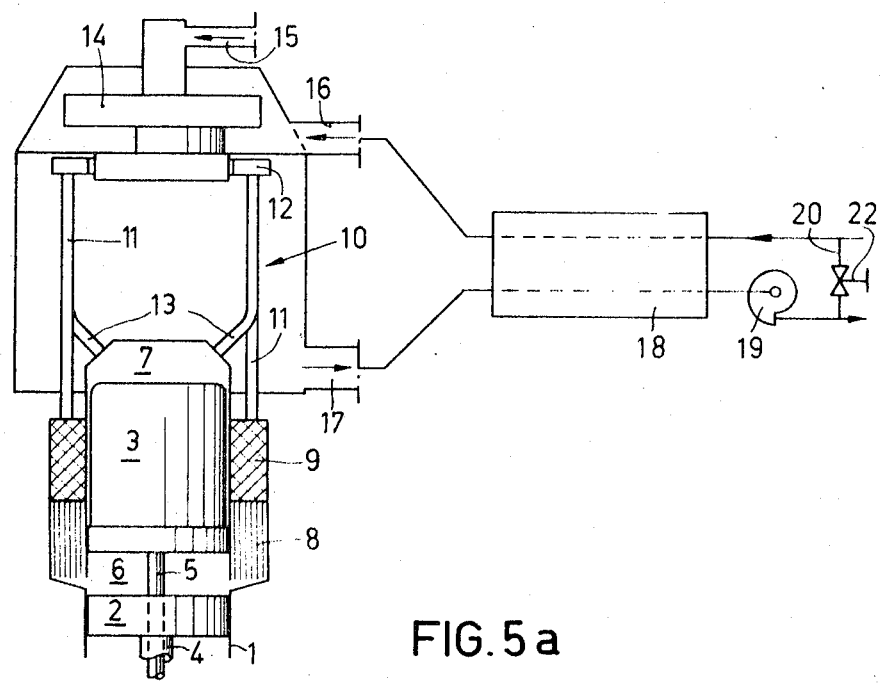
Figure 6:
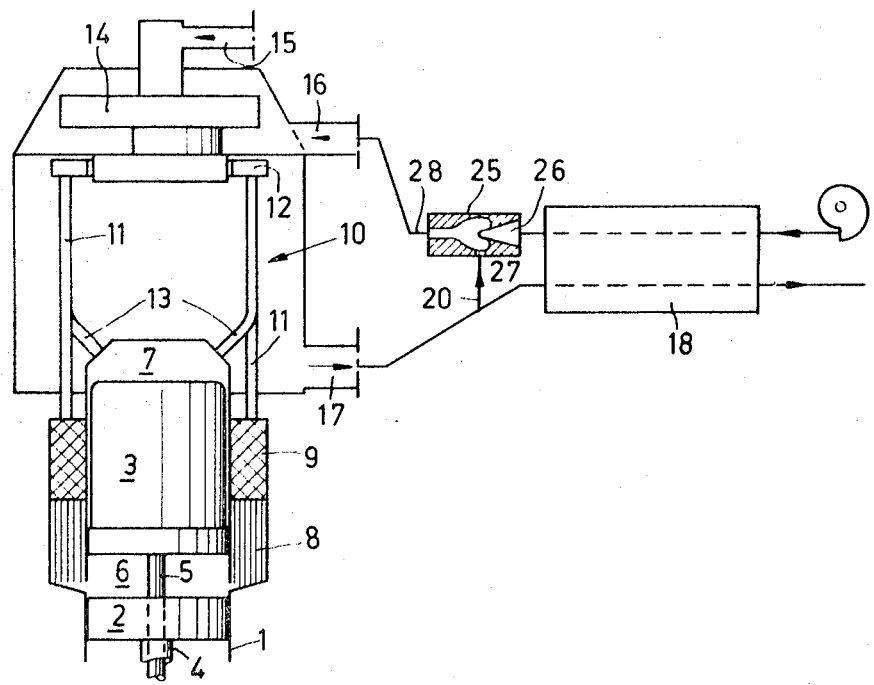

Instead of two fans a single fan may be sufficient, if the connection duct is arranged as is shown in the embodiment of the thermodynamic engine of FIGURE 5. The connecting duct 20 has one end joined to the flue gas outlet duct and the other end joined to the suction duct of the fan 19. The connecting duct 20 then includes the controllable closing member 22. Also the suction duct includes a controllable closing member 23 for controlling the quantities of combustion air and flue gases flowing towards the fan 19. If desired a single closing member in the connecting duct may be sufficient; however, with the fan of the thermodyamic engine of FIGURE 5 arranged in front of the preheater 18, the member may be arranged in the portion of the combustion air supply duct located between the preheater and the burner, in which case the embodiments shown in FIGURES 1 to 4 may be used with a single fan. Then it is only necessary to arrange the fan 19 in that portion of the combustion air supply duct which is located between the burner and the place where the connecting duct 20 joins the combustion air supply duct, or in the flue gas outlet duct between the heater and the place where the connecting duct joins the outlet duct. The latter applies to the engine shown in FIGURE 5a.

In order to control the quantity of flue gases added to the flow of combustion air, the fan 21 of the engines shown in FIGURES 1 to 4 is controllable, whereas in the engine shown in FIGURE 5 a controllable closing member is provided in the connecting duct. In the engine shown in FIGURE 6 the controllable fan or closing member is replaced by an injector 25 for mixing part of the flue gases with the combustion air. Therefore, the inlet side 26 of high pressure medium of the injector 25 communicates with the combustion air supply duct, whereas the suction side 27 of the injector is connected through the connecting duct 20 with the flue gas outlet duct 17. The outlet side of the injector 25 communicates with the combustion air supply duct 16 of the burner. The use of an injector has the great advantage that the mixing ratio between the qualities of combustion air and flue gas remains the same owing to the properties of the injector. Moreover, an injector does not comprise movable parts so that its lifetime may be very long.

It will be obvious from the foregoing, that the invention provides a thermodynamic engine of extremely simple construction while it is ensured that the flue gases contain a very small quality of nitrogen oxides.

What is claimed is:
1. In a hot gas engine including variable volume compression and expansion spaces, a heater, a burner which is supplied by fuel and air and which exhausts flue gas to the heater, and a preheater, the improvement in combination therewith comprising:
   (a) a first duct for flowing air to the preheater,
   (b) a second duct for flowing air through the preheater,
   (c) a third duct for flowing air from the preheater to the burner,
   (d) a fourth duct for flowing some of the flue gas from the heater to and through the preheater for heat exchange relationship with the second duct and air therein,
   (e) a fifth duct for discharging the flue gas from the fourth duct and the preheater,
   (f) a sixth duct for flowing some of the flue gas to one of the first and third air ducts, thereby providing a flow of substantially inert flue gas to mix with the air before it enters the burner, and
   (g) means for urging the flue gas to flow in said sixth duct.

2. Apparatus as defined in claim 1 wherein the sixth duct has one end in communication with said heater, and has its opposite end in communication with said third air duct between the preheater and the burner.

3. Apparatus as defined in claim 1 wherein the means for urging the flue gas comprises an injector disposed in said third duct, the injector having first and second inlets and one outlet, the first inlet receiving air from said second duct, the outlet discharging to said burner, said sixth duct has one end in communication with said heater and has its opposite end in communication with said second injector inlet.

4. Apparatus as defined in claim 3 wherein the injector includes means whereby the mixing ratio of the air and the inert flue gas is substantially the same at all times.

5. Apparatus as defined in claim 1 wherein the sixth duct has one end in communication with said fifth flue gas duct and has its opposite end in communication with said first air duct.

6. Apparatus as defined in claim 1 wherein the sixth duct has one end in communication with said heater and has its opposite end in communication with said first air duct.

7. Apparatus as defined in claim 1 wherein the sixth duct has one end in communication with said fifth flue gas duct, and has its opposite end in communication with the third duct.

8. Apparatus as defined in claim 1 wherein the means for urging the flue gas comprises at least one fan cooperative with said sixth duct.

9. Apparatus as defined in claim 8 wherein the means for urging the flue gas further comprises at least one valve operated in cooperation with the fan.

References Cited

UNITED STATES PATENTS

| | | | |
|---|---|---|---|
| 3,097,686 | 7/1963 | Morrow | 431—115 X |
| 3,335,782 | 8/1967 | De Livois | 431—115 X |
| 1,678,396 | 7/1928 | Koenig | 60—24 |
| 2,621,474 | 12/1952 | Dros et al. | 60—24 |
| 2,627,398 | 2/1953 | Hepburn | 263—15 |
| 2,907,169 | 10/1959 | Newton | 60—24 |
| 3,146,821 | 9/1964 | Wuetig | 158—4.5 X |
| 3,340,830 | 9/1967 | Frey et al. | 110—56 X |

CARROLL B. DORITY, JR., Primary Examiner

U.S. Cl. X.R.

110—49; 431—4, 115

PO-1050
(5/69)

UNITED STATES PATENT OFFICE
CERTIFICATE OF CORRECTION

Patent No. 3456,438     Dated July 22, 1969

Inventor(s) ROELF JAN MEIJER et al

It is certified that error appears in the above-identified patent and that said Letters Patent are hereby corrected as shown below:

Column 1, line 34, "full" should read --fuel--

Signed and sealed this 16th day of June 1970.

(SEAL)
Attest:

Edward M. Fletcher, Jr.
Attesting Officer

WILLIAM E. SCHUYLER, JR.
Commissioner of Patents